(12) United States Patent
Liu et al.

(10) Patent No.: US 10,781,112 B2
(45) Date of Patent: Sep. 22, 2020

(54) DEHYDROGENATION TANK AND BALLAST WATER TREATMENT SYSTEM HAVING THE SAME

(71) Applicant: SUNRUI MARINE ENVIRONMENT ENGINEERING CO., LTD., Qingdao, Shandong Province (CN)

(72) Inventors: Guangzhou Liu, Qingdao (CN); Dongxia Duan, Qingdao (CN); Ping Yao, Qingdao (CN); Hongren Wang, Qingdao (CN)

(73) Assignee: SUNRUI MARINE ENVIRONMENT ENGINEERING CO., LTD., Qingdao, Shandong Province (CN)

( * ) Notice: Subject to any disclaimer, the term of this patent is extended or adjusted under 35 U.S.C. 154(b) by 171 days.

(21) Appl. No.: 15/570,359

(22) PCT Filed: May 18, 2015

(86) PCT No.: PCT/CN2015/079151
§ 371 (c)(1),
(2) Date: Oct. 29, 2017

(87) PCT Pub. No.: WO2016/183762
PCT Pub. Date: Nov. 24, 2016

(65) Prior Publication Data
US 2018/0148345 A1    May 31, 2018

(30) Foreign Application Priority Data
May 18, 2015  (CN) .......................... 2015 1 0250135

(51) Int. Cl.
*B01D 19/00*    (2006.01)
*C02F 1/20*     (2006.01)
(Continued)

(52) U.S. Cl.
CPC ............ *C02F 1/20* (2013.01); *B01D 19/0042* (2013.01); *B01D 19/0047* (2013.01);
(Continued)

(58) Field of Classification Search
CPC .......... C02F 1/004; C02F 1/4674; C02F 1/20; B01D 19/00; B01D 19/0042;
(Continued)

(56) References Cited

U.S. PATENT DOCUMENTS 5,389,248 A * 2/1995 Pare ........................ B01D 53/84
                                                     210/151
5,463,156 A * 10/1995 Muroi ..................... B01D 3/009
                                                     585/400
(Continued)

FOREIGN PATENT DOCUMENTS

CN        101068750 A     11/2007
CN        101428919 A      5/2009
(Continued)

*Primary Examiner* — T. Bennett McKenzie
(74) *Attorney, Agent, or Firm* — Cheng-Ju Chiang

(57) ABSTRACT

The present invention provides a dehydrogenation tank. An atomization spray is disposed at the center of the upper part of the dehydrogenation tank, and flow stirring modules used for stirring a flowing solution are respectively disposed at the middle and the bottom of the dehydrogenation tank. Each of the two flow stirring modules includes at least two layers of flow stirring meshes. By means of disposing the atomizing spray and the flow stirring modules in the dehydrogenation tank, the TRO solution flowing into the dehydrogenation tank are fully stirred, so that hydrogen gas mixed with the TRO solution is able to diffuse out fully and rapidly, thereby increasing dehydrogenation efficiency as well as reducing volume of the dehydrogenation tank. In addition, the present invention also provides a ballast water treatment system having the dehydrogenation tank.

10 Claims, 2 Drawing Sheets

(51) Int. Cl.
*C02F 1/00* (2006.01)
*C02F 1/467* (2006.01)
*B63J 4/00* (2006.01)
*C02F 103/00* (2006.01)
*C02F 103/08* (2006.01)
*B63B 13/00* (2006.01)

(52) U.S. Cl.
CPC .......... *B01D 19/0068* (2013.01); *B63J 4/002* (2013.01); *C02F 1/004* (2013.01); *C02F 1/4674* (2013.01); *B63B 13/00* (2013.01); *C02F 2103/008* (2013.01); *C02F 2103/08* (2013.01)

(58) Field of Classification Search
CPC ............ B01D 19/0047; B01D 19/0068; C01F 2103/008; C01F 2103/08; B63B 13/00
USPC ................................ 95/241–266; 96/155–220
See application file for complete search history.

(56) References Cited

U.S. PATENT DOCUMENTS

| | | | |
|---|---|---|---|
| 6,079,372 A * | 6/2000 | Bekedam | B01D 19/001 122/451 R |
| 2009/0116335 A1* | 5/2009 | Wild | B01F 7/00716 366/249 |

FOREIGN PATENT DOCUMENTS

| | | |
|---|---|---|
| CN | 102502926 A | 6/2012 |
| CN | 102515400 A | 6/2012 |
| CN | 202379779 U | 8/2012 |
| CN | 202430075 U | 9/2012 |
| CN | 103043809 A | 4/2013 |
| CN | 203451322 U | 9/2014 |
| CN | 104817129 A | 8/2015 |
| CN | 104817214 A | 8/2015 |
| CN | 104817219 A | 8/2015 |
| CN | 204779177 U | 11/2015 |
| CN | 205023893 U | 2/2016 |
| JP | S52-149147 U | 11/1977 |
| JP | H10-323671 A | 12/1998 |
| JP | 2000-126507 A | 5/2000 |
| JP | 2001-104941 A | 4/2001 |
| JP | 2007-229577 A | 9/2007 |
| JP | 2009-82844 A | 4/2009 |
| JP | 2009-112996 A | 5/2009 |
| JP | 2009-291729 A | 12/2009 |
| JP | 2010-89020 A | 4/2010 |
| JP | 2011-528982 A | 12/2011 |
| JP | 2012-246553 A | 12/2012 |
| JP | 2014-194047 A | 10/2014 |
| KR | 10-2008-0076176 A | 8/2008 |
| KR | 10-2011-0023484 A | 3/2011 |

* cited by examiner

DEHYDROGENATION TANK AND BALLAST WATER TREATMENT SYSTEM HAVING THE SAME

CROSS REFERENCE TO RELATED APPLICATIONS

This application is a 35 U.S.C. § 371 National Phase conversion of International (PCT) Patent Application No. PCT/CN2015/079151, filed on May 18, 2015. The contents of the above-identified applications are incorporated herein by reference. The PCT International Patent Application was filed and published in Chinese.

TECHNICAL FIELD

The present invention relates to ballast water treatment technology for ship, and more particularly to a dehydrogenation tank and ballast water treatment system having the same.

BACKGROUND

During the voyage of a ship, ballasting water is necessary. When ballasting, local aquatic organisms are brought into the ballast tank and then discharged to the destination waterway with the ballast water. The ballast water, carried by the ship from one place to another, causes the spread of harmful aquatic organisms and pathogens. In order to effectively control and prevent the spread of harmful aquatic organisms and pathogens, which were caused by the ballast water of ships, International Marine Organization (IMO) adopted the "International Convention for the Control and Management of Ships' Ballast Water Sediments" in 2004. "The Convention" requires all ships to be equipped with ballast water treatment system on schedule and is applicable retroactively to all present ships. "The Convention" established a standard (also known as D-2 standard) for the ballast water treatment by explicitly stipulating the size and quantity of survivable organisms, and the species and quantity of pathogenic microorganisms in the ballast water as well.

Branch Electrolysis is a mainstream technique currently implemented in treatment of ballast water. Its operation is as follows. When loading the ballast water in ships, a small portion of the seawater (about 1-2% of the treatment amount of the seawater) is diverted from the ballast water main pipeline to an electrolytic tank and is electrolyzed to further produce a certain amount of total residue oxides (TRO) solution (containing sodium hypochlorite) with high concentration and hydrogen gas as byproducts. The TRO solution, mixed with hydrogen gas, is transferred into a dehydrogenation unit and the hydrogen gas is then separated out from the TRO solution by the dehydrogenation unit. The separated hydrogen gas is diluted with air introduced by an air blower and then discharged outboard. The TRO solution, with the hydrogen gas removed, is introduced back to the ballast water main pipeline through a dispensing pump, and mixes thoroughly with the seawater in the main pipeline. This brings the concentration of TRO solution mixed with the seawater reaches a level which satisfies water quality requirement of the ballast water of IMO (the D-2 standard). In the electrolysis treatment technology, hydrogen gas is an inevitable byproduct produced at the cathode of the electrolytic tank. Since a range of an explosion threshold of hydrogen gas in air is wide (explosion is easily triggered when a concentration of hydrogen in air is in a range from 4 to 75% V/V), hydrogen gas is not allowed to enter the ballast tank and must be separated out from the TRO solution and its concentration is required to be diluted by air to a concentration below the explosion threshold (the hydrogen gas is generally required to be diluted to a concentration less than 1% V/V), and then discharged over the board of the ship. In the electrolysis treatment system for ships' ballast, the equipment which separates hydrogen gas from the TRO solution is called as dehydrogenation unit.

In the electrolysis treatment system for ships' ballast, the dehydrogenation unit is a key component. There are two parameters for evaluating the performance of the dehydrogenation unit: the first one is dehydrogenation efficiency which relates to safety of the entire ballast water treatment system; the second one is the volume of the dehydrogenation unit and the volume of the dehydrogenation unit in the ballast water treatment system is typically large, which leads the entire ballast water treatment system have a large volume. The two parameters often contradict with each other. For example, a dehydrogenation unit with high dehydrogenation efficiency requires a large volume, and a small dehydrogenation unit often needs to sacrifice its dehydrogenation efficiency. Due to limitation of installation room in ships as well as high requirements of safety, there is an urgent need to develop a safe and compact ballast water treatment system. For this purpose, developing of a dehydrogenation unit with small volume and high efficiency is a key to develop a safe and compact ballast water treatment system.

The current dehydrogenation units are divided into two categories. The first category relates to a hydrogen separator based on the principle of cyclone separation. The dehydrogenation unit of this category has an advantage of high dehydrogenation efficiency, however, this kind of dehydrogenation technology requires the inlet pressure and the outlet pressure of cyclone separator remain relatively constant as well as narrow range of flow change of the cyclone separator. That is to say, its application conditions are relatively harsh and strict, and those application conditions are thus not easy to meet in real practice, which greatly decreases the separation effect of the cyclone separator and even result in generation of air-resistance phenomenon. The second category relates to a traditional dehydrogenation tank whose operation principle is to inject the TRO solution mixed with hydrogen gas into the tank, let the TRO solution stay in the tank for a period of time, making the hydrogen gas be accumulated and escape from the TRO solution to achieve the purpose of separation. The dehydrogenation unit of this category has an advantage of high reliability. However, the volume of the dehydrogenation tank of this kind of dehydrogenation unit is relative large and a sufficient long time is needed for the TRO solution mixed with hydrogen gas staying in the tank, to make the hydrogen gas in the TRO solution be fully separated therefrom. Therefore, using a smaller dehydrogenation tank will decrease dehydrogenation efficiency. However, due to the limitation of installation room in ships, using a large dehydrogenation tank will leads a large volume of the ballast water treatment system. Therefore, it is not appropriate for the real practice.

SUMMARY

Accordingly, the present invention provides a dehydrogenation tank having a small volume and high dehydrogenation efficiency and a ballast water treatment system having the same.

In one aspect, the present invention provides a dehydrogenation tank, which includes a flow stirring module disposed at the middle of the dehydrogenation tank for stirring solution flowing therethrough.

According to one embodiment of the present invention, another flow stirring module for stirring solution flowing therethrough is disposed at the bottom of the dehydrogenation tank. The flow stirring modules, disposed at the middle and the bottom of the dehydrogenation tank, both include at least one flow stirring mesh. Mesh size of the flow stirring mesh at the bottom of the dehydrogenation tank is smaller than or equal to mesh size of the flow stirring mesh at the middle of the dehydrogenation tank.

According to one embodiment of the present invention, the mesh size of the flow stirring mesh at the middle of the dehydrogenation tank is approximately 5 by 5 mm and the mesh size of the flow stirring mesh at the bottom of the dehydrogenation tank is approximately 2 by 2 mm.

According to one embodiment of the present invention, the flow stirring modules at the middle and the bottom of the dehydrogenation tank both include at least two layers of flow stirring mesh and a support for supporting the flow stirring mesh and the at least two layers of flow stirring mesh remain a distance of approximately 10 to 20 mm between adjacent layers through the support of flow stirring mesh.

According to one embodiment of the present invention, the dehydrogenation tank includes an atomizing spray disposed at the center of the upper portion of the dehydrogenation tank.

According to one embodiment of the present invention, a distance between the atomizing spray and the top of the dehydrogenation tank is approximately 10 cm and pressure inside a jetting pipe of the atomizing spray is in a range of approximately 3 to 3.5 Bar.

In another aspect, the present invention further provides a ballast water treatment system, which includes an explosion-proof blower, a gas-liquid separator, a dehydrogenation tank and a dispensing pump. The gas-liquid separator is connected to an air outlet of the dehydrogenation tank. The air introduced by the explosion-proof blower is used to mix with the gas passing through the gas-liquid separator. The dispensing pump is connected to a liquid outlet of the dehydrogenation tank. The ballast water treatment system further includes two flow stirring modules respectively disposed at the middle and the bottom of the dehydrogenation tank.

According to one embodiment of the present invention, the two flow stirring modules both include at least two layers of flow stirring mesh and a support of flow stirring mesh, the flow stirring meshes of each flow stirring module remain a distance of approximately 10 to 20 mm between adjacent layers through the support of flow stirring mesh. Mesh size of the flow stirring meshes at the bottom of the dehydrogenation tank is smaller than or equal to mesh size of the flow stirring mesh at the middle of the dehydrogenation tank.

According to one embodiment of the present invention, the dehydrogenation tank includes an atomizing spray disposed at the center of the upper portion of the dehydrogenation tank.

According to one embodiment of the present invention, a distance between the atomizing spray and the top of the dehydrogenation tank is approximately 10 cm and the pressure inside a jetting pipe of the atomizing spray is in a range of approximately 3 to 3.5 Bar.

The embodiments of the present invention provided herein have at least advantages as follows:

In the present invention, by means of disposing flow stirring modules in the dehydrogenation tank, the TRO solution flowing into the dehydrogenation tank is fully stirred, so that hydrogen gas mixed with the TRO solution could diffuse out from the TRO solution fully and rapidly. Therefore, the purposes of increasing dehydrogenation efficiency as well as reducing volume of the dehydrogenation tank are both achieved.

The aforementioned description is a conceptual overview of the present invention. In order to make the technique of the present invention be clearly understood and enable in accordance with specification, and the above or other aspects, features and advantages of the present invention become apparent, embodiments and detailed descriptions in conjunction with the accompanying drawings are provided hereafter.

DETAILED DESCRIPTION OF PREFERRED EMBODIMENTS

In order to further illustrate the techniques and effect of the present invention adopted for achieving the aspects, exemplary embodiments, structure, features and the effects of the dehydrogenation tank and the ballast water treatment system according to the present invention will be described thoroughly in conjunction with the accompanying drawings and the preferred embodiments.

The foregoing or other techniques, features and effects of the present invention will become apparent in the following detailed descriptions of the preferred embodiments in conjunction with the accompanying drawings. In view of descriptions of exemplary embodiments, the techniques and effects of the present invention adopted for achieving aspects will be further and specifically understood. The accompanying drawings are merely used for illustration and description, but not used to limit the present invention.

Figure 1:
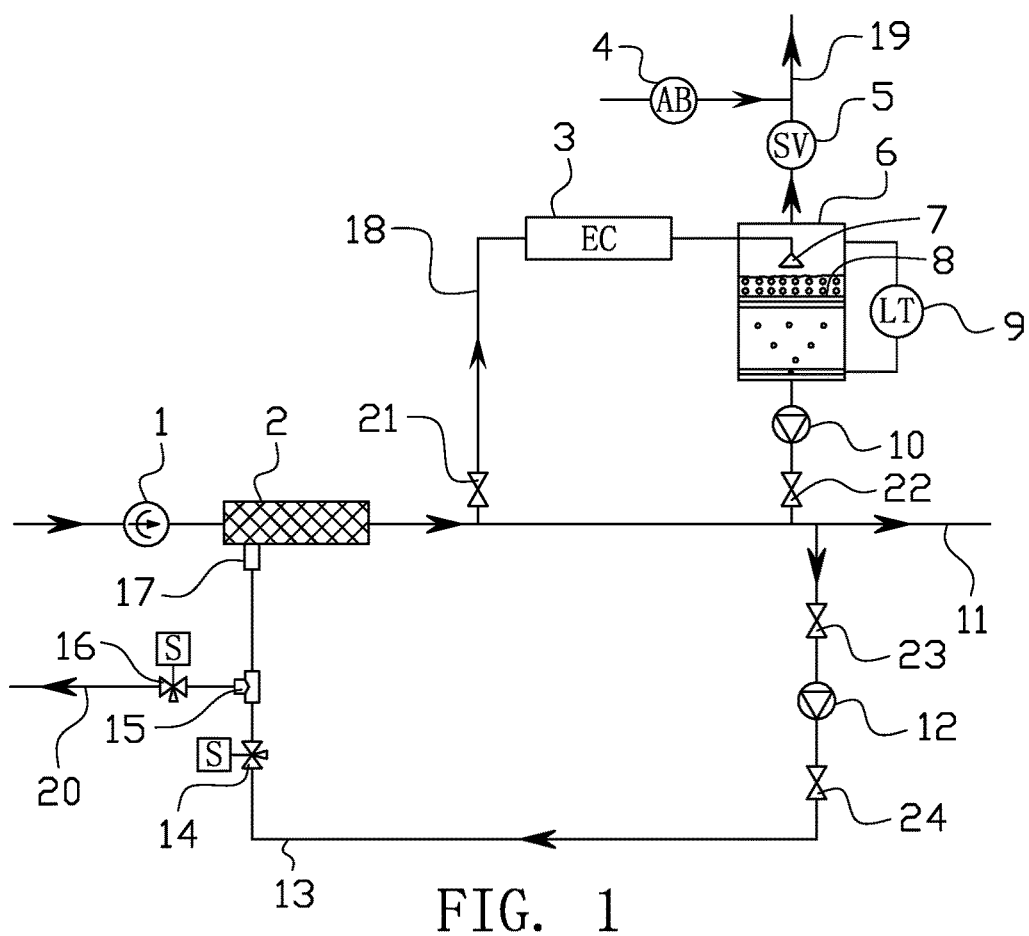
FIG. 1 schematically shows a block diagram of a ballast water treatment system.

Please referring to FIG. 1, a ballast water treatment system according to an embodiment of the present invention includes a ballast water main pipeline 11, a ballast water branch pipeline 18, a hydrogen-discharging pipeline 19, a dispensing pipeline 13 and a waste-discharging pipeline 20, a ballast pump 1 and a filter 2 that are connected to the ballast water main pipeline 11, an electrolytic unit 3, a dehydrogenation tank 6, a first valve 21, a second valve 22 and a first dispensing pump 10 that are connected to the ballast water branch pipeline 18, a gas-liquid separator 5 and an explosion-proof blower 4 that are connected to the hydrogen-discharging pipeline 19, a third valve 23, a fourth valve 24, a second dispensing pump 12, a tee connector 15 and a first electromagnetic valve 14 that are located on and connected to the dispensing pipeline 13, and a second electromagnetic valve 16 that is connected to the waste-discharging pipeline 20. In one embodiment, the first through the fourth valves 21-24 are preferably manual valves.

Specifically, the ballast pump 1 and the filter 2 are sequentially disposed along and connected to the ballast water main pipeline 11.

The electrolytic unit 3 and the dehydrogenation tank 6 are sequentially disposed along and connected to the ballast water branch pipeline 18, and the joint of the inlet of the ballast water branch pipeline 18 and the ballast water main pipeline 11 is located at the downstream of the filter 2.

The first valve 21 is disposed on and connected to the ballast water main pipeline 18 and located between the ballast water main pipeline 11 and the inlet of the electrolytic unit 3. The electrolytic unit 3 is electrically connected to a control unit (not shown in drawings) of the ballast water treatment system so as to electrolyze seawater under control of the control unit and produce a mixture of TRO solution containing sodium hypochlorite and hydrogen gas.

Figure 3:
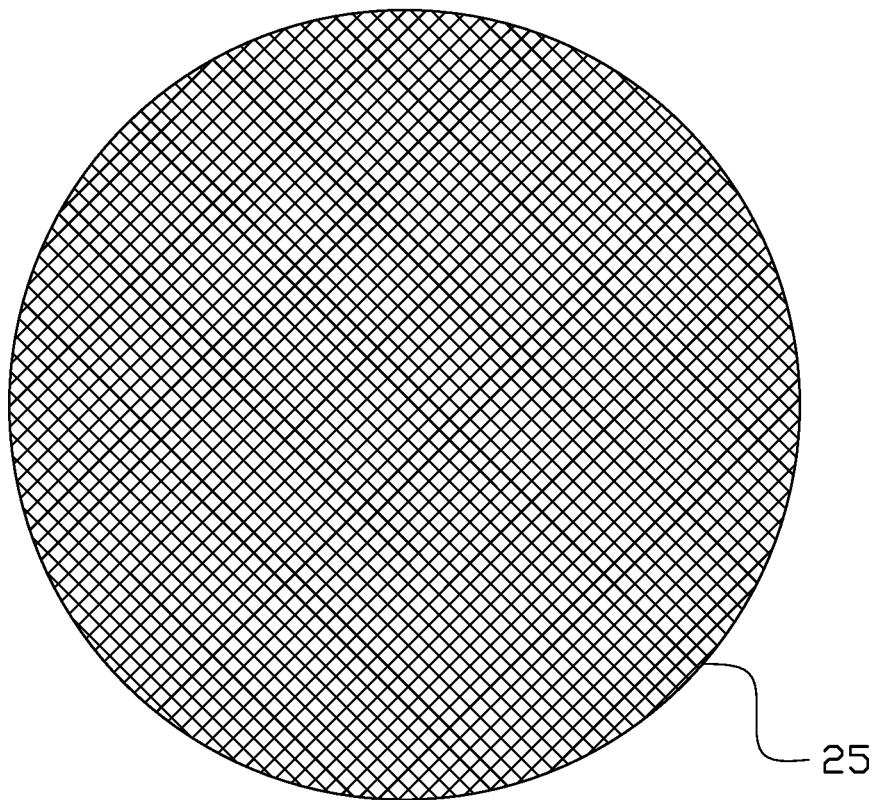
FIG. 3 schematically shows a top view of the flow stirring module illustrated in FIG. 2.
Figure 4:
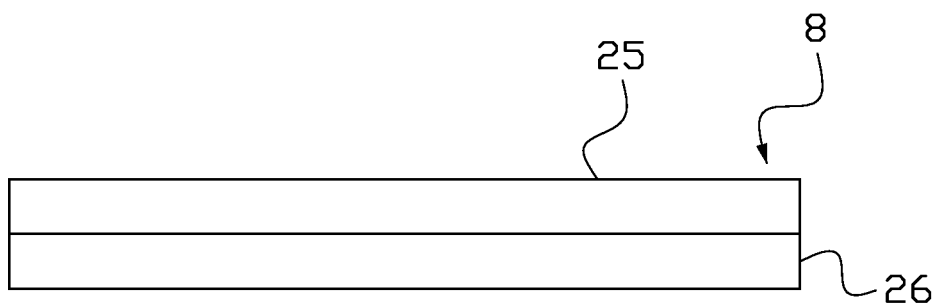
FIG. 4 schematically shows a front view of the flow stirring module illustrated in FIG. 2.

The inlet of the dehydrogenation tank 6 is connected to the outlet of the electrolytic unit 3. Please referring to FIG. 2 to FIG. 4 together, the dehydrogenation tank 6 is made of carbon steel, the volume of the dehydrogenation tank 6 is substantially equals to the amount of TRO solution flowing into the tank within 1 min (for example, if the flow rate of TRO solution is 6 $m^3$/h, the volume of the dehydrogenation tank 6 should be around 100 L), the ratio of the diameter to the height of the tank is preferably 3:4, the thickness of the wall of the tank is approximately 3 to 4 mm, and sealant is applied inside the tank to prevent corrosion caused by TRO solution. A liquid inlet of the dehydrogenation tank 6 is extended across to the center of upper portion of the dehydrogenation tank 6 through a jetting pipeline, an atomizing spray 7 is provided at the liquid inlet of the dehydrogenation tank 6, hydrogen gas mixed with the TRO solution and conducted to the dehydrogenation tank 6 can be separated rapidly through atomization of the atomizing spray 7. The atomizing spray 7 spaces a distance of around 10 cm from the top of the tank in the height direction of the dehydrogenation tank 6, moreover, in order to ensure effect of atomization, the internal pressure of the jetting pipeline and the atomizing spray 7 is preferably in a range of approximately 3 to 3.5 Bar. After being atomized and sprayed through the atomizing spray 7, most of the hydrogen gas in the TRO solution is removed, but a few of the smaller bubbles is still contained in the TRO solution.

To further increase dehydrogenation efficiency and remove the small bubbles remained in the TRO solution, the present invention further provides two flow stirring modules 8 (respectively called the first flow stirring module and the second flow stirring module hereafter) at the middle and the bottom of the dehydrogenation tank 6. In one embodiment, these two flow stirring modules 8 are both composed of stainless steel mesh, and each includes at least one layer of flow stirring mesh 25 and a support 26 of flow stirring mesh for supporting and fastening the at least one flow stirring mesh. In this embodiment, the flow stirring mesh 25 and the support 26 of flow stirring mesh are both made of stainless steel type 316L, and each of the flow stirring modules 8 includes at least two layers of flow stirring mesh 25. Specifically, in one embodiment, each of the flow stirring modules 8 includes three layers of flow stirring mesh 25 and these three layers of flow stirring mesh 25 are fixed and fastened together through the support 26 of flow stirring mesh by soldering. The mesh size of the first flow stirring module is approximately 5 by 5 mm, the mesh size of the second flow stirring module is approximately 2 by 2 mm, each support 26 of flow stirring mesh is used to fix the corresponding flow stirring meshes 25 together and remain a distance of approximately 10 to 20 mm (preferably 10 mm) between the adjacent layers. Understandably, in other embodiments of the present invention, the mesh sizes of the first flow stirring module and the second flow stirring module can be other appropriate numbers only if the mesh size of the first flow stirring module is greater than the mesh size of the second flow stirring module, and the first flow stirring module and the second flow stirring module both could facilitate to accumulate and separate hydrogen gas from the TRO solution. Definitely, in one embodiment of the present invention, the mesh size of the first flow stirring module and the second flow stirring module could equal to each other, for example the mesh size both are 5 by 5 mm or 2 by 2 mm.

Figure 2:
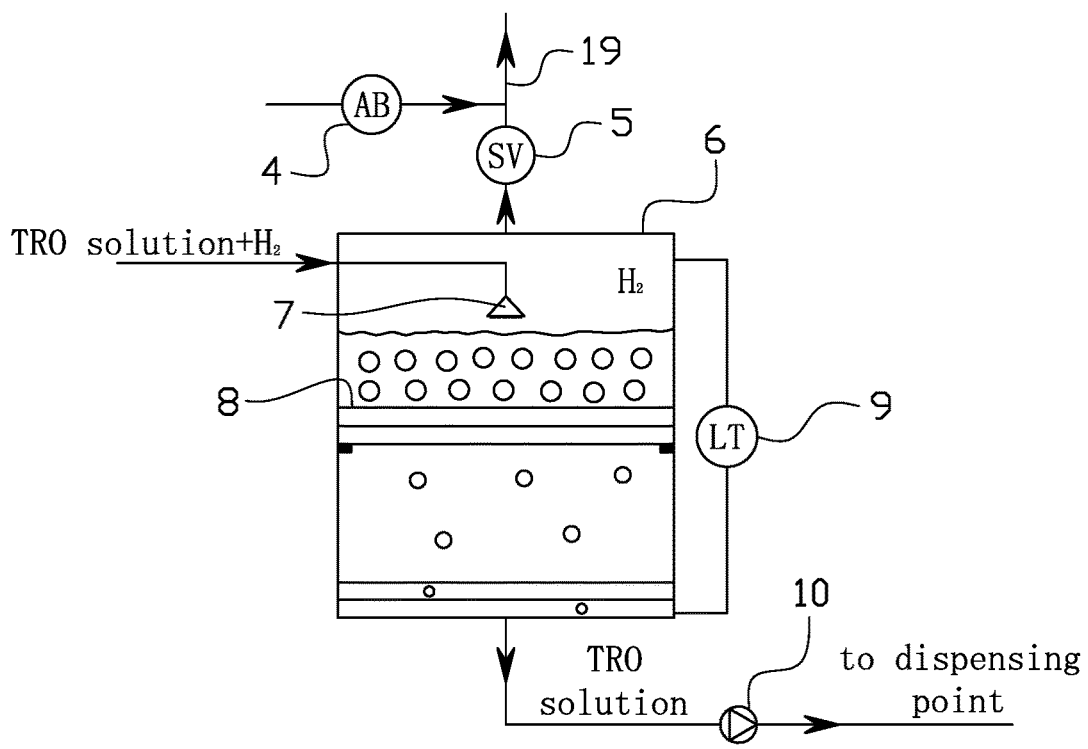
FIG. 2 schematically shows a structural diagram of a dehydrogenation tank.

Please continue to refer to FIG. 1 and FIG. 2, the gas-liquid separator 5 is disposed on and connected to the hydrogen discharging pipeline 19 and is connected to an air outlet disposed on the top of the dehydrogenation tank 6. The explosion-proof blower 4 is connected to the hydrogen discharging pipeline 19, and the air introduced by the explosion-proof blower 4 is mixed with the gas passing through the gas-liquid separator 5, so that the hydrogen gas separated by the dehydrogenation tank is diluted to a concentration below the explosion threshold, and then discharged over the board of the ships. The first dispensing pump 10 is connected to a liquid outlet at the bottom of the dehydrogenation tank 6, and connected to the ballast water main pipeline 11 through the second valve 22, the dehydrogenated TRO solution is injected into the dispensing point of the ballast water main pipeline 11 through the first dispensing pump 10. In addition, a level gauge 9 is disposed at one side of the dehydrogenation tank 6, the level gauge 9 is capable of remote communicating with the control unit, so that the level of the liquid inside the dehydrogenation tank 6 could be controlled between ½ to ¾ of the total height of the dehydrogenation tank 6 through the cooperation of the control unit, the level gauge 9 and the first dispensing pump 10. In order to better control the level of the liquid inside the dehydrogenation tank 6, the first dispensing pump 10 is preferably a variable frequency dispensing pump.

The second dispensing pump 12, the third valve 23, the fourth valve 24, the tee connector 15 and the first electromagnetic valve 14 are disposed on and connected to the dispensing pipeline 13. The joint of the dispensing pipeline 13 and the ballast water main pipeline 11 is located at the downstream of the joint of the outlet of the ballast water branch pipeline 18 and the ballast water main pipeline 11. The third valve 23 is located close to the ballast water main pipeline 11 and between the ballast water main pipeline 11 and the second dispensing pump 12. The second dispensing pump 12 is located between the third valve 23 and the fourth valve 24. The first electromagnetic valve 14 is located at the downstream of the fourth valve 24, and between the fourth valve 24 and the tee connector 15. The tee connector 15 is located between the first electromagnetic valve 14 and a waste discharging outlet 17 of the filter 2. The second electromagnetic valve 16 is located on the waste-discharging pipeline 20 and connected the tee connector 15 to the outside of the ship.

The operation principle of the ballast water treatment system according to the present invention is: when the system is loading the ballast water, seawater is pumped into the filter 2 by the ballast pump 1, after the seawater is filtrated through the filter 2, the filtration passes through the waste-discharging outlet 17 of the filter 2, the tee connector 15 and the second electromagnetic valve 16, and then is discharged over the board of the ships while the filtrated seawater is conducted to the ballast water main pipeline 11. A portion of the seawater in the ballast water main pipeline 11 is introduced directly into the ballast tank while the other portion is conducted to the electrolytic unit 3 and electrolyzed to produce TRO solution and hydrogen gas. The TRO solution mixed with hydrogen gas is transferred to the dehydrogenation tank 6 and the hydrogen gas is separated from the TRO solution by the dehydrogenation tank 6. After the hydrogen gas is further separated through the gas-liquid separator 5, it is mixed and diluted with the air introduced by the explosion-proof blower 4 and is discharged over the board of the ships while the dehydrogenated TRO solution is introduced back into the ballast water main pipeline 11 through the action of the first dispensing pump 10. When the process of loading ballast water is finished (i.e. when the ballast pump 1 stops working), turning on the third valve 23, the fourth valve 24, the first electromagnetic valve 14 and the second dispensing pump 12, and turning off the second electromagnetic valve 16, and a certain amount of the seawater which was filtrated, electrolyzed and dehydrogenated, is pumped from the ballast water main pipeline 11 by the second dispensing pump 12 and is introduced into the filter 2 through the waste-discharging outlet 17. After the second dispensing pump 12 operates for a certain period, turning off the second dispensing pump 12, and all the valves connected to the waste-discharging outlet 17 of the filter 2 (i.e., the third valve 23, the fourth valve 24 and the first electromagnetic valve 14), and keeping the treated seawater in the filter 2 until next loading.

In summary, the ballast water treatment system of the present invention includes at least one of the following advantages:

1. The present invention provides two flow stirring modules 8 at the middle and the bottom of the dehydrogenation tank 6, which can fully stir the TRO solution flowing into the dehydrogenation tank 6, and accelerate collection and separation of the hydrogen gas from the TRO solution, so that the hydrogen gas mixed with the TRO solution could escape from the TRO solution fully and rapidly, thereby increasing dehydrogenation efficiency as well as reducing volume of the dehydrogenation tank.

2. The present invention provides the upper and the lower flow stirring modules 8 with different mesh sizes, to make the flow stirring module 8 with large mesh size separate larger bubbles from the TRO solution and the flow stirring module 8 with small mesh size separate smaller bubbles from the TRO solution, so that the bubbles with different size are separated sequentially and the dehydrogenation efficiency is further increased.

3. The present invention provides an atomizing spray 7 at the center of the upper portion of the dehydrogenation tank 6, so that hydrogen gas mixed with the TRO solution can escape from the TRO solution rapidly to increase the dehydrogenation efficiency.

In the end, exemplary embodiments are provided hereafter to describe the achievements of the present invention:

Exemplary Embodiment One

The dehydrogenation technique of the present invention is used in a bulk ship with a dead weight tonnage of 35000 DWT and a rated treatment amount of the ballast water treatment system is 1000 m$^3$/h. The volume of the dehydrogenation tank is reduced by 55% and the dehydrogenation efficiency is greater than 99%, moreover, the operation of the system is reliable and the performance is stable without being effected by change of ship conditions.

Exemplary Embodiment Two

The dehydrogenation technique of the present invention is used in a chemical cargo ship of 72000 DWT, whose rated treatment amount of the ballast water treatment system is 2000 m$^3$/h. The volume of dehydrogenation tank is reduced by 52% and the dehydrogenation efficiency is greater than 99%, moreover, the operation of the system is reliable and the performance is stable without being effected by change of ship conditions.

Exemplary Embodiment Three

The dehydrogenation technique of the present invention is used in an ore ship of 180000 DWT, whose rated treatment amount of the ballast water treatment system is 3000 m$^3$/h. The volume of the dehydrogenation tank is reduced by 54% and the dehydrogenation efficiency is greater than 99%, moreover, the operation of the system is reliable and the performance is stable without being effected by change of ship conditions.

The descriptions above are embodiments of the present invention only and are not used, by any way, to limit the present invention. Although the present invention has been described with reference to the above embodiments, those embodiments are not used to limit the present invention, it will be apparent to anyone of ordinary skill in the art that slight changes or modifications to the described embodiments may be made to become equivalent embodiments without departing from the technique scope of the present invention. On the contrary, any slight and simple changes, equivalent variations and modifications according to the disclosure of the present invention should fall within the technique scope of the present invention.

INDUSTRIAL APPLICABILITY

The present invention provides flow stirring modules in a dehydrogenation tank, which can fully stir the TRO solution flowing into the dehydrogenation tank, so that hydrogen gas mixed with the TRO solution could escape from the TRO solution fully and rapidly, thereby increasing dehydrogenation efficiency as well as reducing volume of the dehydrogenation tank.

What is claimed is:

1. A dehydrogenation tank, comprising:
    a flow stirring module disposed at the middle of the dehydrogenation tank;
    a flow stirring module disposed at the bottom of the dehydrogenation tank, the flow stirring modules at the middle and the bottom of the dehydrogenation tank each comprising at least two adjacent layers of flow stirring mesh and a support of flow stirring mesh, and the at least two adjacent layers of flow stirring meshes in each of the middle and the bottom modules are kept a distance of 10 to 20 mm between the adjacent layers by the support of flow stirring mesh; and
    an atomizing spray disposed at the center of the upper portion of the dehydrogenation tank, a distance between the atomizing spray and the top of the dehydrogenation tank being 10 cm and a pressure inside a jetting pipeline of the atomizing spray being in a range of 3 to 3.5 Bar;
    wherein a mesh size of the flow stirring mesh at the bottom of the dehydrogenation tank is smaller than a mesh size of the flow stirring mesh at the middle of the dehydrogenation tank; and
    the mesh size of the flow stirring mesh at the middle of the dehydrogenation tank is 5 by 5 mm and the mesh size of the flow stirring mesh at the bottom of the dehydrogenation tank is 2 by 2 mm.

2. The dehydrogenation tank of claim 1, wherein a liquid inlet of the dehydrogenation tank is extended across to the center of the upper portion of the dehydrogenation tank through the jetting pipeline, the atomizing spray is provided at the liquid inlet of the dehydrogenation tank.

3. A ballast water treatment system, comprising a blower, a gas-liquid separator, a dehydrogenation tank and a dispensing pump, the gas-liquid separator being connected to an air outlet of the dehydrogenation tank, air introduced by the blower being used for mixing with the gas passing through the gas-liquid separator, the dispensing pump being connected to a liquid outlet of the dehydrogenation tank, wherein the dehydrogenation tank comprises flow stirring modules respectively disposed at the middle and the bottom of the dehydrogenation tank for stirring flowing solution, the flow stirring modules at the middle and the bottom of the dehydrogenation tank each comprise at least two adjacent layers of flow stirring mesh and a support of flow stirring mesh, the at least two adjacent layers of flow stirring meshes of each flow stirring module remain a distance of 10 to 20 mm between the adjacent layers, and a mesh size of the flow stirring mesh at the bottom of the dehydrogenation tank is smaller than a mesh size of the flow stirring mesh at the middle of the dehydrogenation tank, the mesh size of the flow stirring mesh at the middle of the dehydrogenation tank is 5 by 5 mm and the mesh size of the flow stirring mesh at the bottom of the dehydrogenation tank is 2 by 2 mm, the dehydrogenation tank further comprises an atomizing spray disposed at the center of the upper portion of the dehydrogenation tank, a distance between the atomizing spray and the top of the dehydrogenation tank is 10 cm and a pressure inside a jetting pipeline of the atomizing spray is in a range of 3 to 3.5 Bar.

4. The ballast water treatment system of claim 3, wherein a liquid inlet of the dehydrogenation tank is extended across to the center of the upper portion of the dehydrogenation tank through the jetting pipeline, the atomizing spray is provided at the liquid inlet of the dehydrogenation tank.

5. A dehydrogenation tank, comprising at least two flow stirring modules apart from each other in a certain distance along a vertical direction with one of the flow stirring modules being on a downside flow of the other flow stirring module, wherein the flow stirring modules each comprises at least one flow stirring mesh, and the flow stirring mesh of the downside flow stirring module has a mesh size smaller than a mesh size of the flow stirring mesh of the upside flow stirring module, the dehydrogenation tank further comprises an atomizing spray disposed at the center of the upper portion of the dehydrogenation tank, a distance between the atomizing spray and the top of the dehydrogenation tank is 10 cm and a pressure inside a jetting pipeline of the atomizing spray is in a range of 3 to 3.5 Bar, the mesh size of the flow stirring mesh of the upside flow stirring module is 5 by 5 mm and the mesh size of the stirring mesh of the downside flow stirring module is 2 by 2 mm.

6. The dehydrogenation tank of claim 5, wherein the downside flow stirring module is disposed at the bottom of the dehydrogenation tank and the upside flow stirring module is disposed at the middle of the dehydrogenation tank.

7. The dehydrogenation tank of claim 5, wherein the flow stirring modules each comprises at least two adjacent layers of flow stirring mesh and a support of flow stirring mesh and the at least two adjacent layers of each flow stirring mesh remain a distance in a range of 10 to 20 mm between the adjacent layers by the support of flow stirring mesh.

8. The dehydrogenation tank of claim 5, wherein the flow stirring modules are made of stainless steel.

9. The dehydrogenation tank of claim 5, wherein the dehydrogenation tank is made of carbon steel.

10. The dehydrogenation tank of claim 5, wherein a liquid inlet of the dehydrogenation tank is extended across to the center of the upper portion of the dehydrogenation tank through the jetting pipeline, the atomizing spray is provided at the liquid inlet of the dehydrogenation tank.

* * * * *